UNITED STATES PATENT OFFICE.

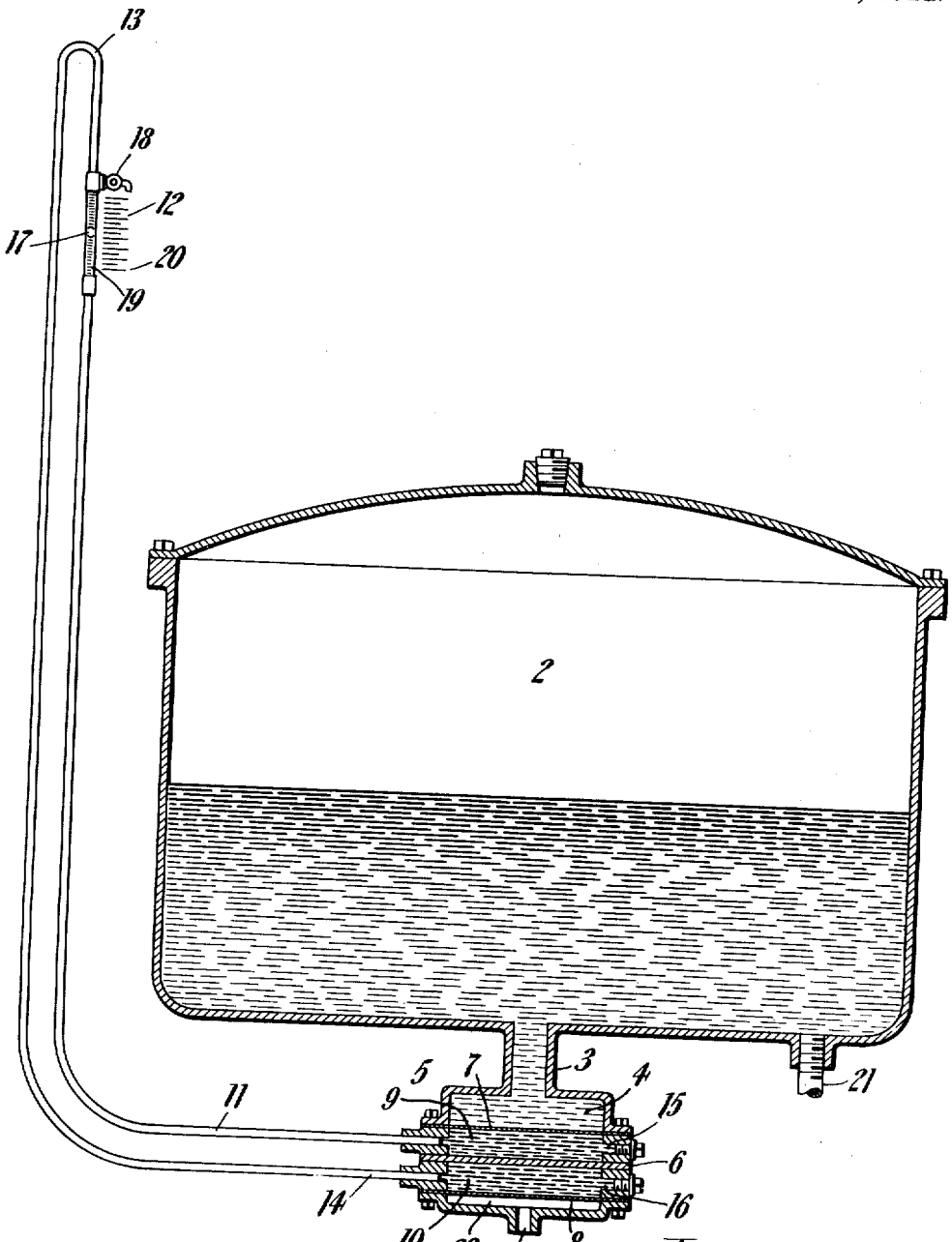

ABRAHAM NOVICK, OF BROOKLYN, AND EDWARD FISH, OF NEW YORK, N. Y., ASSIGNORS TO FERDINAND L. SMITHE, OF NEW YORK, N. Y.

LIQUID-LEVEL GAUGE.

1,413,235.   Specification of Letters Patent.   Patented Apr. 18, 1922.

Application filed December 28, 1920. Serial No. 433,627.

*To all whom it may concern:*

Be it known that we, ABRAHAM NOVICK and EDWARD FISH, citizens of the United States, and residing, respectively, at New York, borough of Brooklyn, in the county of Kings and State of New York, and at New York, borough of Manhattan, in the county of New York and State of New York, have invented certain new and useful Improvements in Liquid-Level Gauges, of which the following is a specification.

This invention relates to liquid level gauges and particularly to that class thereof which is adapted for indicating, preferably on a scale, the height of a body of liquid in a tank remote from the scale and located at any height relatively to said scale.

The object of our improvements is to provide a gauge of the class specified, simple in construction, accurate in operation, and which may be used with equal facility in a number of different environments.

With these ends in view our improvements comprise features which are illustrated in their preferred embodiment in the drawing accompanying this specification, wherein the figure is a side elevation, largely in section, of a tank and gauge to which our improvements are applied.

Gauges of the general class of which we have knowledge, while in many cases giving excellent service in stationary installations, have been unsatisfactory because of inaccuracy when applied to moving vehicles, such as automobiles. In such service the car on which they are mounted is subject to the unevennesses of the road and particularly in going up and down hills, when the gauge is liable to such changes of relation to the tank as to cause the reading to be erroneous. In our improvements we have eliminated these difficulties and have provided a gauge of accuracy and reliability.

Directing attention now to the drawings, 2 is a tank, such for instance as is adapted for holding the gasoline supply in an automobile. This tank may be provided with the usual supply pipe 21 leading to the engine, not shown. It is also provided with a pipe 3, preferably leading from the bottom of the tank and communicating with the upper face of diaphragm 7, in diaphragm box 5. This pipe 3 may be conveniently enlarged at its lower end to form a receiving chamber 4 in the upper part of box 5. Said box is divided through its mid-portion by rigid wall 6, and spaced apart therein above and below said rigid wall are diaphragms 7 and 8 respectively, whereby are formed chambers 9 and 10. The lower face of diaphragm 8 may be exposed to the atmosphere, or said diaphragm may form the upper wall of an expansion chamber 22 containing air, and which chamber may be closed by a plug, not shown, in outlet 23, to keep said diaphragm free of dirt. The terms upper and lower as applied to chambers 9 and 10 are relative only, as said box 5 may with equal efficiency be placed on its side with diaphragms 7 and 8 in vertical positions, or said box may be arranged in any other convenient position.

Connected with chamber 9 is one end of pipe 11, of small calibre, and which pipe leads from said chamber to some convenient place of observation, preferably to gauge glass 19 inserted in said pipe at scale 12, conveniently located for reading, as for instance on the instrument board of the automobile, not shown, in which automobile the gasoline tank is installed. Said pipe 11 after passing said scale makes a return bend at 13 and the other end, 14, of said pipe is connected with chamber 10 of the diaphragm box. That portion of pipe 11 comprised of gauge glass 19 being transparent the contents of said pipe are visible therethrough. While it would be theoretically acceptable to have the whole of pipe 11 of glass, it is obvious that all but that portion adjacent the scale is preferably made of metal so as to withstand bending and shocks incident to a moving vehicle. Chambers 9 and 10 may be provided with openings 15 and 16 respectively, closed by plugs as shown, for the purpose of filling the gauge system with an indicating fluid, such as colored alcohol.

Chambers 9 and 10 and pipe 11 are filled with such fluid except for a short space opposite the scale, and which space is occupied by indicating means such as a bubble of air 17. The filling of pipe 11 and the proper location of the air bubble may be accomplished with the assistance of vent cock 18 at the top of the gauge glass 19. Diaphragms 7 and 8 are for convenience usually made of equal diameter, thickness and resilience, and chambers 9 and 10 of equal capacity, but variations in these regards may be made with equally efficient results, the scale 12 being graduated to meet any given conditions.

The operation of the device is as follows: Assuming chambers 9 and 10 and pipe 11 to be filled as described except for the bubble of air 17, and assuming that bubble of air to be located at the zero line 20 of the scale, gasoline or other liquid is poured into tank 2. The weight of said liquid will cause a slight downward depression in flexible diaphragm 7, which will slightly reduce the size of chamber 9, thereby forcing a small portion of the contents of said chamber into pipe 11, whereby bubble 17 will be caused to rise from zero mark 20 upwardly in the transparent portion of said tube. At the same time an equal amount of the liquid in the return portion 14 of said pipe will be forced back into chamber 10, its admission to that chamber being permitted by the yielding downwardly of diaphragm 8.

In the drawing, tank 2 is illustrated as about half filled and bubble 17 is shown at a proportionate height against scale 12. As the contents of tank 2 are withdrawn, the weight of the column on top of diaphragm 7 is correspondingly decreased, thus permitting said diaphragm to move upwardly, whereby the size of chamber 9 is increased and a small portion of the liquid from pipe 11 flows thereinto, thereby lowering bubble 17 a proportionate amount, and a small portion of the liquid in chamber 10 flows outwardly into return pipe 14 and thence into gauge glass 19 following bubble 17 downwardly.

We claim:

1. In a gauge for fluids the combination of a tank for the liquid to be gauged, a diaphragm box below said tank including two chambers separated by a rigid wall, each of said chambers having a yieldable diaphragm forming one wall thereof, a communicating passage from said tank to the outer face of one of said diaphragms, a pipe leading from one of said chambers and back to the other chamber, and a transparent portion in said pipe, said chambers and said pipe being filled with a liquid except for the presence of a bubble of air therein, and said bubble of air being located within the transparent portion of said pipe.

2. In a gauge for fluids the combination of a tank for the liquid to be gauged, a diaphragm box below said tank including two chambers separated by a rigid wall, each of said chambers having a yieldable diaphragm forming one wall thereof, a communicating passage from said tank to the outer face of one of said diaphragms, a scale, a pipe leading from one of said chambers to said scale and back to the other chamber, and a transparent portion in said pipe opposite said scale, said chambers and said pipe being filled with a liquid except for the presence of a bubble of air therein, and said bubble of air being located within the transparent portion of said pipe.

3. In a gauge for fluids the combination of a tank for the liquid to be gauged, a diaphragm box below said tank including two chambers separated by a rigid wall, each of said chambers having a yieldable diaphragm forming one wall thereof, a chamber above one of said diaphragms the lower wall of which is formed by said diaphragm, a chamber below the other diaphragm the upper wall of which is formed by said other diaphragm, means for permitting access of the liquid to be gauged to the outer face of the diaphragm of one of the two chambers separated by the rigid wall, a pipe leading from one of the chambers separated by said rigid wall to the other thereof, a transparent portion in said pipe, said pipe being filled with a liquid except for the presence of a bubble of air therein, and said bubble of air being located within the transparent portion of said pipe.

4. In a gauge for fluids the combination of a diaphragm box including two chambers separated by a rigid wall, each of said chambers having a yieldable diaphragm forming one wall thereof, a pipe leading from one of said chambers and back to the other chamber, a transparent portion in said pipe, said pipe being filled with a liquid except for the presence of a bubble of air therein, said bubble of air being located within the transparent portion of said pipe, and means for permitting access of the liquid to be gauged to the outer face of the diaphragm of one of the two chambers separated by the rigid wall.

5. In a liquid level gauge the combination of a box including two chambers separated by a rigid wall, each of said chambers having a yieldable wall, a pipe containing liquid and leading from one of said chambers back to the other chamber, a transparent portion in said pipe, means in the liquid in said pipe located within the transparent portion thereof for indicating the height of the liquid to be gauged, and means for permitting access of the liquid to be gauged to the outer face of the yieldable wall of one of said two chambers.

6. In a liquid level gauge the combination of two chambers, each having a yieldable wall, a pipe containing fluid leading from one of said chambers back to the other chamber, a transparent portion in said pipe, means in the fluid in said pipe located within the transparent portion thereof for indicating the height of the liquid to be gauged, and means for permitting access of the liquid to be gauged to the outer face of the yieldable wall of one of said two chambers.

7. In a liquid level gauge the combination of two chambers, each having a yieldable wall, a pipe containing fluid leading from one of said chambers back to the other chamber, means in a portion of said pipe for indicating the height of the liquid to be gauged and means for permitting access of the liquid to be gauged to the outer face of the yieldable wall of one of said two chambers.

In witness whereof, we hereby affix our signatures this 24th day of December, 1920.

ABRAHAM NOVICK.
EDWARD FISH.

Certificate of Correction.

It is hereby certified that in Letters Patent No. 1,413,235, granted April 18, 1922, upon the application of Abraham Novick, of Brooklyn, and Edward Fish, of New York, N. Y., for an improvement in "Liquid-Level Gauges," errors appear in the printed specification requiring correction as follows: Page 2, lines 40, 55, 71 and 92, claims 1, 2, 3 and 4, for the words "gauge for fluids" read *liquid level gauge;* and that the said Letters Patent should be read with these corrections therein that the same may conform to the record of the case in the Patent Office.

Signed and sealed this 9th day of May, A. D., 1922.

[SEAL.]                          KARL FENNING,

*Acting Commissioner of Patents.*